H. L. FERRIS.
HAY WAGON CONSTRUCTION.
APPLICATION FILED JUNE 16, 1919.
1,333,300.
Patented Mar. 9, 1920.
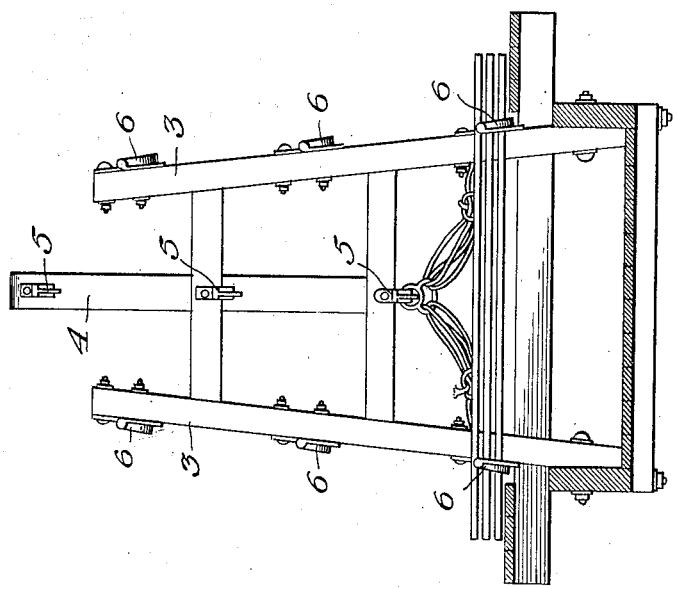
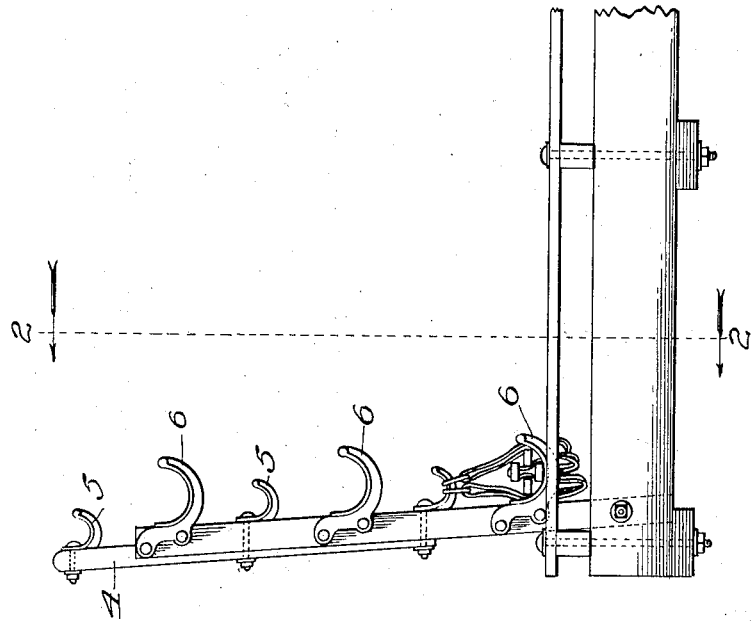
Inventor:
Henry L. Ferris,

UNITED STATES PATENT OFFICE.

HENRY L. FERRIS, OF HARVARD, ILLINOIS, ASSIGNOR TO HUNT, HELM, FERRIS & COMPANY, OF HARVARD, ILLINOIS, A CORPORATION OF ILLINOIS.

HAY-WAGON CONSTRUCTION.

1,333,300.   Specification of Letters Patent.   Patented Mar. 9, 1920.

Application filed June 16, 1919. Serial No. 304,497.

*To all whom it may concern:*

Be it known that I, HENRY L. FERRIS, a citizen of the United States, residing at Harvard, in the county of McHenry and State of Illinois, have invented a new and useful Improvement in Hay-Wagon Construction, of which the following is a specification.

My invention relates to certain new and useful improvements in hay-wagon construction and is fully described and explained in the specification and shown in the accompanying drawings, in which—

Figure 1 is a side elevation of the forward portion of a hay-wagon embodying my improvements, and Fig. 2 a section on the line 2 of Fig. 1.

Referring to the drawings 3 are the lateral members and 4 is the central member of the frame work which is usually found at the forward end of a hay-wagon to confine the load. To the central member are secured hooks 5, three in number one above the other, and to the lateral members are secured curved arms 6 in pairs, there being three such pairs, one above the other, each pair of curved arms being located somewhat below the level of the corresponding hooks at the center.

In the use of the device one end of a hay-sling is engaged with the central hook as shown at the lower part of Fig. 1; the four cross-bars 7 of the sling are then laid in the lower pair of curved arms and the opposite end of the hay-sling is likewise engaged with the hook. The three hay slings normally used in handling a load are all arranged in a similar manner, although but one is illustrated in Fig. 1. In loading the wagon the rear end of the sling is disengaged and the sling is stretched out on the bottom of the wagon and one-third of the load is placed upon it. This brings the level of the hay up to the second pair of arms from the bottom whereupon the second sling is stretched out and another third of the load is placed upon that. The third sling is likewise stretched out in a similar manner and the loading completed. When the load is removed in the usual way the slings, as fast as they are freed from their load and returned by the hay carrier, are properly connected for further use and hung up in position where they remain out of the way and always ready for use.

I realize that considerable variation is possible in the details of the construction herein shown, and I do not intend to limit myself thereto, except as pointed out in the following claims, in which it is my intention to claim all the novelty inherent in the device as broadly as is permitted by the state of the art.

I claim as new and desire to secure by Letters Patent:

1. In combination a hay-wagon having a vertical frame-work at one end comprising lateral members and a member disposed intermediate thereof and having a plurality of pairs of arms on said lateral members, the pairs being arranged above each other and each being adapted to support the cross-bars of a hay-sling, and a corresponding series of hooks on said intermediate member for engaging and supporting the ends of the sling.

2. In combination a hay wagon having a vertical frame-work at one end comprising lateral members and a member disposed intermediate thereof and having a plurality of pairs of arms on said lateral members, the pairs being arranged above each other and each being adapted to support the cross-bars of a hay sling, and a corresponding series of hooks on said intermediate member for engaging and supporting the ends of the sling, the pairs of arms on said lateral members being disposed opposite each other and somewhat below the hooks on the intermediate member.

In testimony whereof I have hereunto set my hand and seal this fifth day of June, 1919.

HENRY L. FERRIS. [L. S.]